United States Patent
Brown et al.

(10) Patent No.: US 8,125,485 B2
(45) Date of Patent: *Feb. 28, 2012

(54) ANIMATING SPEECH OF AN AVATAR REPRESENTING A PARTICIPANT IN A MOBILE COMMUNICATION

(75) Inventors: William A. Brown, Raleigh, NC (US); Richard W. Muirhead, Tyler, TX (US); Francis X. Reddington, Tampa, FL (US); Martin A. Wolfe, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 41 days.

This patent is subject to a terminal disclaimer.

(21) Appl. No.: 12/622,553

(22) Filed: Nov. 20, 2009

(65) Prior Publication Data

US 2010/0060647 A1  Mar. 11, 2010

Related U.S. Application Data

(63) Continuation of application No. 11/870,686, filed on Oct. 11, 2007.

(51) Int. Cl.
*G06T 13/00* (2006.01)
(52) U.S. Cl. ........................ 345/473; 345/474; 345/957
(58) Field of Classification Search ........................ None
See application file for complete search history.

(56) References Cited

U.S. PATENT DOCUMENTS

| | | | |
|---|---|---|---|
| 6,151,571 A * | 11/2000 | Pertrushin | 704/209 |
| 6,577,998 B1 * | 6/2003 | Yamamoto | 704/270 |
| 7,027,054 B1 * | 4/2006 | Cheiky et al. | 345/473 |
| 7,356,470 B2 * | 4/2008 | Roth et al. | 704/270 |
| 7,382,395 B1 * | 6/2008 | Saburi et al. | 348/14.01 |
| 2003/0031381 A1 * | 2/2003 | Ho et al. | 382/285 |
| 2003/0117485 A1 * | 6/2003 | Mochizuki et al. | 348/14.01 |
| 2006/0126924 A1 * | 6/2006 | Liu et al. | 382/154 |
| 2006/0188144 A1 * | 8/2006 | Sasaki et al. | 382/154 |
| 2008/0120558 A1 * | 5/2008 | Nathan et al. | 715/764 |
| 2008/0141175 A1 * | 6/2008 | Sarna et al. | 715/848 |
| 2008/0151786 A1 * | 6/2008 | Li et al. | 370/276 |
| 2009/0087046 A1 * | 4/2009 | Kuhn | 382/128 |
| 2010/0007665 A1 * | 1/2010 | Smith et al. | 345/473 |

* cited by examiner

*Primary Examiner* — Daniel Hajnik
(74) *Attorney, Agent, or Firm* — Brandon C. Kennedy; Mark Vallone; Biggers & Ohanian, LLP (57) ABSTRACT

Animating speech of an avatar representing a participant in a mobile communication including selecting one or more images; selecting a generic animation template; fitting the one or more images with the generic animation template; texture wrapping the one more images over the generic animation template; and displaying the one or more images texture wrapped over the generic animation template. Receiving an audio speech signal; identifying a series of phonemes; and for each phoneme: identifying a new mouth position for the mouth of the generic animation template; altering the mouth position to the new mouth position; texture wrapping a portion of the one or more images corresponding to the altered mouth position; displaying the texture wrapped portion of the one or more images corresponding to the altered mouth position of the mouth of the generic animation template; and playing the portion of the audio speech signal represented by the phoneme.

18 Claims, 8 Drawing Sheets

ANIMATING SPEECH OF AN AVATAR REPRESENTING A PARTICIPANT IN A MOBILE COMMUNICATION

CROSS-REFERENCE TO RELATED APPLICATION

This application is a continuation application of and claims priority from U.S. patent application Ser. No. 11/870,686, filed on Oct. 11, 2007.

BACKGROUND OF THE INVENTION

1. Field of the Invention

The field of the invention is data processing, or, more specifically, methods, apparatus, and products for animating speech of an avatar representing a participant in a mobile communication.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Typical computer systems may be implemented in many devices, including, for example cellular phones. Although computer systems implemented in cellular phones are powerful, networks connecting cellular phones create a bottleneck for communications. Real-time video conferencing between cellular phones across a network, for example, is difficult to implement due to the large amount of bandwidth required for transmission of audio and video data corresponding to a real-time video and audio feed. Today there exists no low-bandwidth, or lightweight, method of displaying a representation of a cellular phone user across a network.

SUMMARY OF THE INVENTION

Methods, mobile communications devices, and products for animating speech of an avatar representing a participant in a mobile communication are disclosed that include displaying, by an animation module installed on the mobile communications device, the avatar representing the participant. Displaying the avatar includes receiving a text source; identifying, in dependence upon the text source, the participant; selecting, from data storage in dependence upon the identification of the participant, one or more images to represent the participant; selecting from data storage a generic animation template for the participant, the generic animation template having a mouth, the mouth characterized by a mouth position; fitting the one or more images representing the participant with the generic animation template; texture wrapping the one more images representing the participant over the generic animation template; and displaying, by the animation module, the one or more images texture wrapped over the generic animation template. The methods, mobile communications devices, and products for animating speech of an avatar also include converting, by the animation module, the text source to an audio speech signal; identifying, by the animation module from the audio speech signal, a series of phonemes, each phoneme representing a portion of the audio speech signal; and for each phoneme: identifying a new mouth position for the mouth of the generic animation template, altering the mouth position of the mouth of the generic animation template to the new mouth position, texture wrapping a portion of the one or more images corresponding to the altered mouth position of the mouth of the generic animation template, displaying the texture wrapped portion of the one or more images corresponding to the altered mouth position of the mouth of the generic animation template, and playing, synchronously with the displayed texture wrapped portion of the one or more images, the portion of the audio speech signal represented by the phoneme.

Methods, mobile communications devices, and products for animating speech of an avatar representing a participant in a mobile communication are disclosed that include displaying, by an animation module installed on the mobile communications device, the avatar representing the participant. Displaying the avatar includes selecting from data storage one or more images to represent the participant; selecting from data storage a generic animation template for the participant, the generic animation template having a mouth and at least one emotive feature, the mouth characterized by a mouth position; fitting the one or more images representing the participant with the generic animation template; texture wrapping the one more images representing the participant over the generic animation template; and displaying, by the animation module, the one or more images texture wrapped over the generic animation template, Animating speech of the avatar also includes receiving, by the animation module, an audio speech signal derived from the mobile communication of the participant; identifying, by the animation module from the audio speech signal, a series of phonemes and one or more points of voice inflection greater than a predetermined threshold, each phoneme representing a portion of the audio speech signal; for each phoneme: identifying a new mouth position for the mouth of the generic animation template, altering the mouth position of the mouth of the generic animation template to the new mouth position, texture wrapping a portion of the one or more images corresponding to the altered mouth position of the mouth of the generic animation template, displaying the texture wrapped portion of the one or more images corresponding to the altered mouth position of the mouth of the generic animation template, and playing, synchronously with the displayed texture wrapped portion of the one or more images, the portion of the audio speech signal represented by the phoneme; and for each point of voice inflection greater than the predetermined threshold, triggering a motion key-frame caption that alters display of the emotive feature synchronously with the playing of a portion of the audio speech signal including the point of voice inflection greater than the predetermined threshold.

Methods, mobile communications devices, and products for animating speech of an avatar representing a participant in a mobile communication are disclosed that include displaying, by an animation module installed on the mobile communications device, the avatar representing the participant. Displaying the avatar includes selecting from data storage one or more images to represent the participant; selecting from data storage a generic animation template for the participant, the generic animation template having a mouth, the mouth characterized by a mouth position; fitting the one or more images representing the participant with the generic animation template; texture wrapping the one more images representing the participant over the generic animation template; and displaying, by the animation module, the one or more images texture wrapped over the generic animation template. Animating speech of the avatar also includes receiving, by the animation module, an audio speech signal derived from the mobile communication of the participant; identifying a vocal pattern from a particular portion of the audio speech signal; determining whether the vocal pattern matches a predetermined vocal pattern; identifying, by the animation module from the audio speech signal, a series of phonemes, each phoneme representing a portion of the audio speech signal; and for each phoneme: identifying a new mouth position for the mouth of the generic animation template, altering the mouth position of the mouth of the generic animation template to the new mouth position, texture wrapping a portion of the one or more images corresponding to the altered mouth position of the mouth of the generic animation template, displaying the texture wrapped portion of the one or more images corresponding to the altered mouth position of the mouth of the generic animation template, and playing, synchronously with the displayed texture wrapped portion of the one or more images, the portion of the audio speech signal represented by the phoneme. If the vocal pattern of the particular portion of the audio speech signal matches a predetermined vocal pattern, displaying an indication of the predetermined vocal pattern synchronously with the playing of the particular portion of the audio speech signal.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
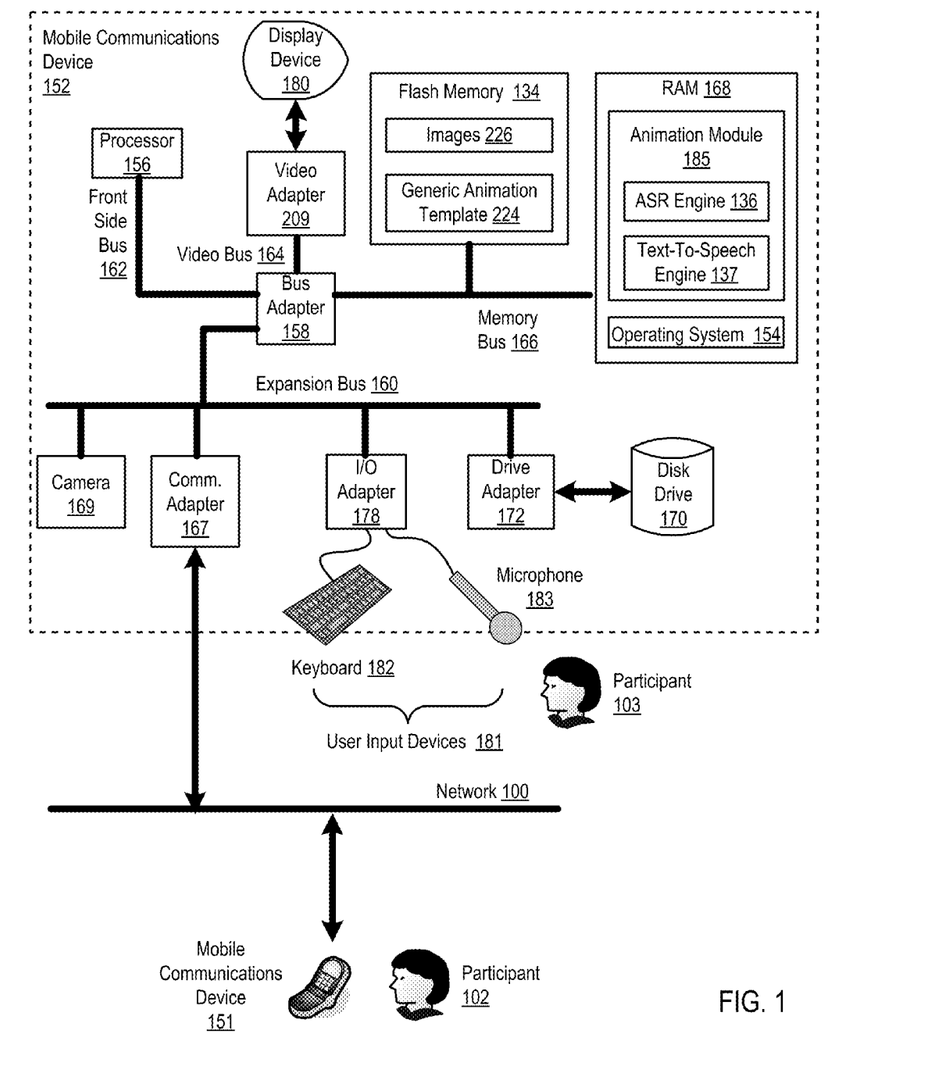
FIG. 1 sets forth a functional block diagram of a system for animating speech of an avatar representing a participant in a mobile communication according to embodiments of the present invention.

Exemplary methods, apparatus, and products for animating speech of an avatar representing a participant in a mobile communication in accordance with the present invention are described with reference to the accompanying drawings, beginning with FIG. 1. FIG. 1 sets forth a functional block diagram of a system for animating speech of an avatar representing a participant in a mobile communication according to embodiments of the present invention. An avatar is a graphical representation of a participant in a mobile communication. Avatars are typically two or three dimensional representations. Avatars useful in embodiments of the present invention, for example, may be implemented as a three dimensional model that represents the participant.

Mobile communications are any communications between mobile communications devices. Types of mobile communications may include voice communications between participants, Short Message Service ('SMS') text messages, Multimedia Messaging Service ('MMS') messages, email, or others as will occur to those of skill in the art. The mobile communications device of FIG. 1 includes several user input devices (181) that a participant (103) may use to communicate through the mobile communications device (152). The mobile communications device of FIG. 1 for example, includes a keyboard (182) and a microphone (183).

In the system of FIG. 1 the participant (102) uses a mobile communications device for mobile communications with another participant (103) using another mobile communications device (152). A mobile communications device (152) may be implemented as a cellular phone, a smart phone, or other device as will occur to those of skill in the art. A cellular phone is a long-range, portable electronic device used for mobile communication. In addition to the standard voice function of a telephone, current cellular phones may support many additional services such as SMS, MMS, email, and internet access. A smart phone is typically implemented as a full-feature cellular phone with personal computer functionality. Many smart phones are cellular phones that support full featured email capabilities with the functionality of a complete personal organizer. A common feature of many smart phones is that applications for enhanced data processing and connectivity are capable of being installed on the device, in contrast to non-smart cellular phones which typically only support sandboxed applications. The applications that may be installed on a smart phone may be developed by the manufacturer of the device, by the operator of the device, or by any other third-party software developer. Also in contrast to non-smart cellular phones, smart phones typically include interfaces including a miniature 'QWERTY' keyboard, a touch screen, or secure access to company email services.

The system of FIG. 1 includes an exemplary mobile communications device (152) useful in animating speech of an avatar representing a participant in a mobile communication according to embodiments of the present invention. The mobile communications device (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an animation module (185), a module of computer program instructions for animating speech of an avatar representing a participant in a mobile communication according to embodiments of the present invention. The exemplary animation module (185) of FIG. 1 is capable of selecting, from data storage, one or more images (226) to represent the participant (102); selecting, from data storage, a generic animation template (224) for the participant; fitting the one or more images (226) representing the participant (102) with the generic animation template (224);

texture wrapping the one more images (226) representing the participant (102) over the generic animation template (224); and displaying, by the animation module, the one or more images (226) texture wrapped over the generic animation template (224). Data storage in a mobile communications device may be implemented in various forms. In the mobile communications device (152) of FIG. 1, for example, data storage may be implemented as flash memory (134) or as a disk drive (170). Many typical mobile communications devices include non-removable as well as removable flash memory. Removable flash memory may be implemented as any type of memory card including, for example, a Secure Digital ('SD') memory card, a Multimedia Card ('MMC'), a Memory Stick, a Compact Flash ('CF') memory card, a SmartMedia ('SM') card, and so on as will occur to those of skill in the art. Flash memory data storage useful in animating speech of an avatar representing a participant in a mobile communication according to embodiments of the present invention may be implemented as either the removable or non-removable type of flash memory.

The animation module (185) of FIG. 1 is also capable of receiving an audio speech signal derived from the mobile communication of the participant and identifying, from the audio speech signal, a series of phonemes, each phoneme representing a portion of the audio speech signal. For each identified phoneme, the animation module (185) of FIG. 1 is capable of identifying a new mouth position for the mouth of the generic animation template (224); altering the mouth position of the mouth of the generic animation template (224) to the new mouth position; texture wrapping a portion of the one or more images (226) corresponding to the altered mouth position of the mouth of the generic animation template (224); displaying the texture wrapped portion of the one or more images (226) corresponding to the altered mouth position of the mouth of the generic animation template (224); and playing, synchronously with the displayed texture wrapped portion of the one or more images (226), the portion of the audio speech signal represented by the phoneme.

The animation module (185) of FIG. 1 may receive an audio speech signal derived from the mobile communication of the participant (102) by receiving text from the participant's mobile communications device and converting the text to synthesized speech or, in the alternative, receiving audio from the participant's mobile communications device. The animation module (185) of FIG. 1 may convert text to speech with a speech engine. Stored in RAM (168) of the mobile communications device of FIG. 1 is, for example, a text-to-speech engine (137). A text-to-speech engine (137) is a module of computer program instructions capable of converting text to an audio speech signal. Although the text-to-speech engine (137) in the example of FIG. 1 is shown as part of the animation module (185) for clarity, readers of skill in art will immediately recognize that a text-to-speech engine useful in animating speech of an avatar representing a participant in a mobile communication according to embodiments of the present invention may be an independent module of computer program instructions. Examples of speech engines capable of converting text to speech for recording in the audio portion of a multimedia file include, for example, IBM's ViaVoice® Text-to-Speech, Acapela Multimedia TTS, AT&T Natural Voices™ Text-to-Speech Engine, and Python's pyTTS class. Each of these text-to-speech engines is composed of a front end that takes input in the form of text and outputs a symbolic linguistic representation to a back end that outputs the received symbolic linguistic representation as a speech waveform.

Typically, speech synthesis engines operate by using one or more of the following categories of speech synthesis: articulatory synthesis, formant synthesis, and concatenative synthesis. Articulatory synthesis uses computational biomechanical models of speech production, such as models for the glottis and the moving vocal tract. Typically, an articulatory synthesizer is controlled by simulated representations of muscle actions of the human articulators, such as the tongue, the lips, and the glottis. Computational biomechanical models of speech production solve time-dependent, 3-dimensional differential equations to compute the synthetic speech output. Typically, articulatory synthesis has very high computational requirements, and has lower results in terms of natural-sounding fluent speech than the other two methods discussed below.

Formant synthesis uses a set of rules for controlling a highly simplified source-filter model that assumes that the glottal source is completely independent from a filter which represents the vocal tract. The filter that represents the vocal tract is determined by control parameters such as formant frequencies and bandwidths. Each formant is associated with a particular resonance, or peak in the filter characteristic, of the vocal tract. The glottal source generates either stylized glottal pulses or periodic sounds and generates noise for aspiration. Formant synthesis generates highly intelligible, but not completely natural sounding speech. However, formant synthesis has a low memory footprint and only moderate computational requirements.

Concatenative synthesis uses actual snippets of recorded speech that are cut from recordings and stored in an inventory or voice database, either as waveforms or as encoded speech. These snippets make up the elementary speech segments such as, for example, phones and diphones. Phones are composed of a vowel or a consonant, whereas diphones are composed of phone-to-phone transitions that encompass the second half of one phone plus the first half of the next phone. Some concatenative synthesizers use so-called demi-syllables, in effect applying the diphone method to the time scale of syllables. Concatenative synthesis then strings together, or concatenates, elementary speech segments selected from the voice database, and, after optional decoding, outputs the resulting speech signal. Because concatenative systems use snippets of recorded speech, they have the highest potential for sounding like natural speech, but concatenative systems require large amounts of database storage for the voice database.

The animation module (185) of FIG. 1 may identify from the audio speech signal a series of phonemes by using an automatic speech recognition ('ASR') engine. A phoneme is the smallest unit of speech that distinguishes meaning Phonemes are not phonetic segments themselves, but are abstractions of phonetic segments. An example of a phoneme would be the /t/ found in words like tip, stand, writer, and cat.

An ASR engine (136) is a module of computer program instructions, also stored in RAM (168) in this example. Like the text-to-speech engine (137), the ASR engine (136) is shown in FIG. 1 for clarity as part of the animation module (185). Readers of skill in the art, however, will immediately recognize that such ASR engine may be an independent module of computer program instructions. In carrying out automated speech recognition, the ASR engine (136) receives speech for recognition in the form of at least one digitized word and uses frequency components of the digitized word to derive a Speech Feature Vector ('SFV'). An SFV may be defined, for example, by the first twelve or thirteen Fourier or frequency domain components of a sample of digitized speech. The ASR engine can use the SFV to identify phonemes for the word from a language-specific acoustic model, a mapping of SFVs and phonemes.

The mobile communications device (152) of FIG. 1 also includes a camera (169) for capturing digital images. The camera (169) of FIG. 1 may be used for capturing one or more digital images of the participant (102) and storing the captured digital images for use as the one or more images (226) to represent the participant (102). That is, the one or more images (226) used in animating an avatar representing the participant (102) may be actual images of the participant captured by the camera (169) at a time before the animation of the avatar. In the alternative to capturing the digital images of the participant, the images (226) stored in flash memory (134) may be preconfigured by the manufacturer of the mobile communications device (152). That is, the manufacturer of the mobile communications device (152) may provide default images that can be used in animating an avatar of a participant of a mobile communication. A manufacturer may for example provide default male or female images.

Also stored in RAM (168) is an operating system (154). Operating systems useful animating speech of an avatar representing a participant in a mobile communication according to embodiments of the present invention include UNIX™, Linux™, Microsoft XP™, Microsoft Vista™, AIX™, IBM's i5/OS™, and others as will occur to those of skill in the art. The operating system (154), animation module (185), text-to-speech engine (137), and ASR engine (136) in the example of FIG. 1 are shown in RAM (168), but many components of such software typically are stored in non-volatile memory also, such as, for example, on a disk drive (170).

The mobile communications device (152) of FIG. 1 includes disk drive adapter (172) coupled through expansion bus (160) and bus adapter (158) to processor (156) and other components of the mobile communications device (152). Disk drive adapter (172) connects non-volatile data storage to the mobile communications device (152) in the form of disk drive (170). Disk drive adapters useful in mobile communications devices for animating speech of an avatar representing a participant in a mobile communication according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example mobile communications device (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. In the example of FIG. 1 the mobile communications device includes two exemplary user input devices (181), a keyboard (182) and a microphone (183). The participant (103) may use the keyboard to compose SMS test messages and email, among other things, and the participant may use to the microphone to capture audio speech signals of the participant during a mobile communication.

The example mobile communications device (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary mobile communications device (152) of FIG. 1 includes a communications adapter (167) for data communications with other mobile communications device (151) and for mobile communications with a network (100). The network (100) is shown for clarity as a single network, but readers of skill in the art will immediately recognize that such a network (100) may actually be implemented as a combination of several networks, a network for voice calls as a well as a separate data communications network for example. A network implemented for voice calls may be a Time Division Multiple Access ('TDMA') network, a Global System for Mobile communications ('GSM') network, a Code Division Multiple Access ('CDMA'), and so on as will occur to those of skill in the art. A network implemented for data communications, including SMS text messages, email, internet traffic, and MMS messages, may be an Enhanced Data Rate for GSM Evolution ('EDGE') network, Wideband Code Division Multiple Access ('W-CDMA') network, a High-Speed Downlink Packet Access ('HSDPA') network, and so on as will occur to those of skill in the art.

The arrangement of mobile communications devices making up the exemplary system illustrated in FIG. 1 are for explanation, not for limitation. Mobile communication systems useful according to various embodiments of the present invention may include additional computers, servers, routers, other devices not shown in FIG. 1, as will occur to those of skill in the art. Networks in such mobile communication systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
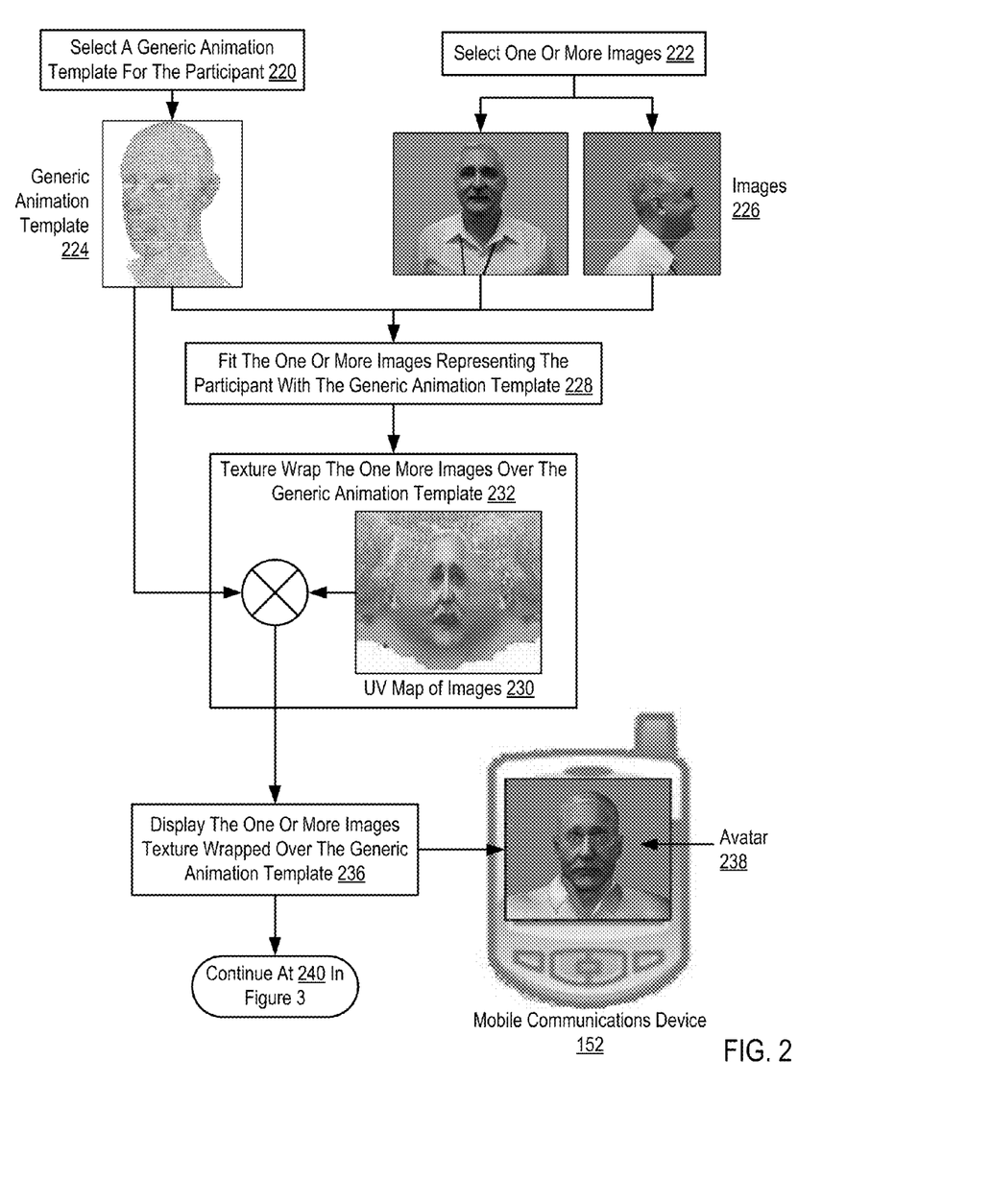
FIG. 2 sets forth a portion of a flow chart illustrating an exemplary method for animating speech of an avatar representing a participant in a mobile communication according to embodiments of the present invention.
Figure 3:
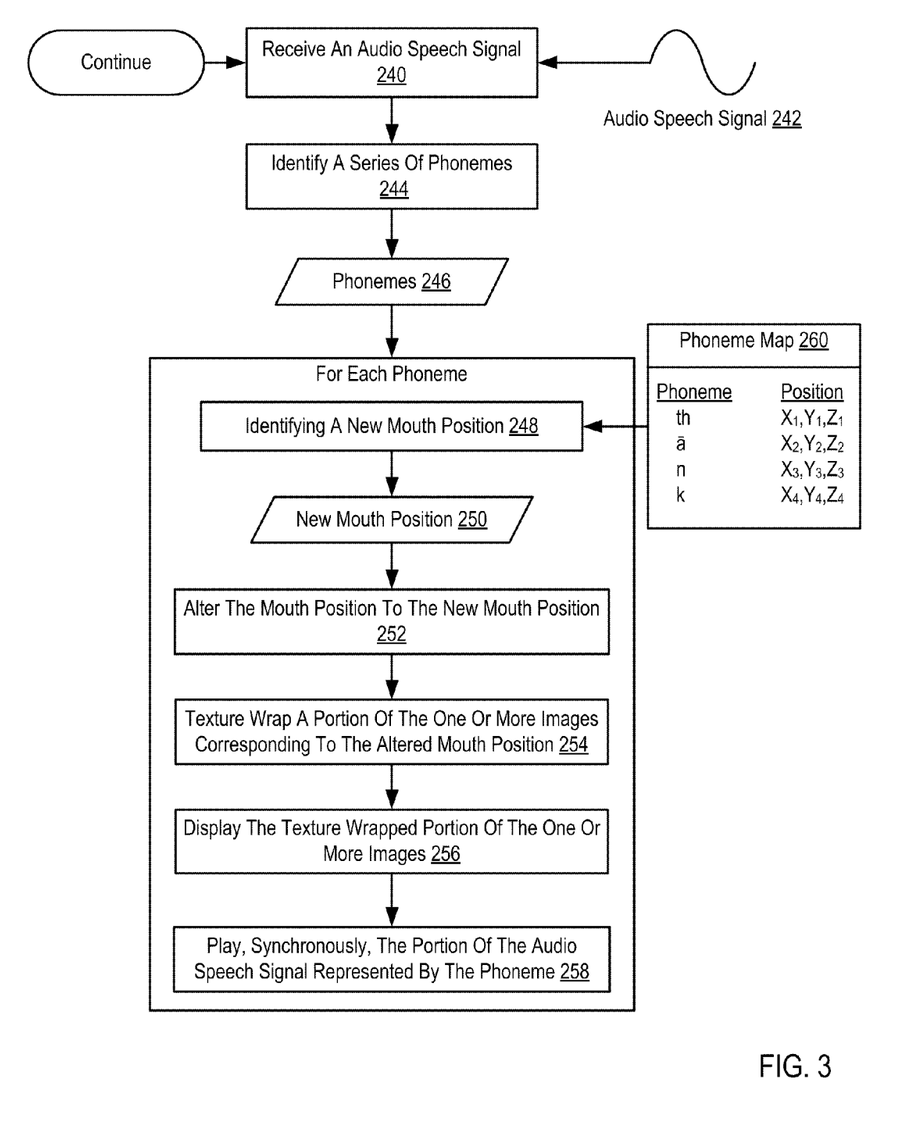
FIG. 3 sets forth a further portion of a flow chart illustrating an exemplary method for animating speech of an avatar representing a participant in a mobile communication according to embodiments of the present invention.

For further explanation, FIG. 2 and FIG. 3 set forth a flow chart illustrating an exemplary method for animating speech of an avatar representing a participant in a mobile communication according to embodiments of the present invention. The method of FIG. 2 sets forth a portion of a flow chart illustrating an exemplary method for animating speech of an avatar representing a participant in a mobile communication according to embodiments of the present invention that includes selecting (222), by an animation module installed on the mobile communications device (152) from data storage, one or more images (226) to represent the participant. Selecting (222) one or more images (226) to represent the participant may be carried out by identifying the participant in the mobile communication and selecting the one or more images in dependence upon the identified participant. Identifying the participant may be carried out by identifying the phone number from which the participant is calling. In many typical mobile communications devices, a profile associated with a particular participant may be stored. The profile may include one or more of the participant's phone numbers, the participant's email address, one or more images of the participant, and so on as will occur to those of skill in the art. Upon receiving a call from the participant, the animation module may identify the participant using the participant's phone number, match the phone number to a stored profile for the participant, and match the profile to one or more images to represent the participant.

The method of FIG. 2 also includes selecting (220), by the animation module from data storage, a generic animation template (224) for the participant. A generic animation template is a generalized representation of a participant used as a template for the avatar representing the participant. A generic animation template may be a three-dimensional model of a genderless human's head or bust. The three-dimensional model may also be a data structure containing information defining the shape of the head. The three-dimensional model may be rendered for display according to one of a number of different modeling processing, including for example, a polygonal modeling process or a Non-uniform, rational B-Spline ('NURBS') modeling process. Polygonal modeling is a modeling process in which an object is represented by approximating the objects' surfaces using a number of polygons. In such an implementation, the three-dimensional model may be implemented as a data structure containing information describing the vertices of a number of polygons. NURBS modeling is a modeling process in which an object is represented by a number of curves. In such an implementation, the three-dimensional model may be implemented as a data structure containing information describing curves that represent the head, including a number of control points and weights associated with each point. A model, according to either implementation, may be displayed as wire-frame model, a number of lines specifying the outer edges of an object. In the method FIG. 2, for example, the generic animation template (224) of FIG. 2 is shown as a wire-frame model for clarity.

In the example of FIG. 2 the generic animation template (224) has a mouth and the mouth is characterized by a mouth position. The mouth of the generic animation template may be defined according to the modeling processes described above. The mouth position of the generic animation template is the default position of the mouth. That is, when the avatar is not in animation, the mouth will be rendered in the default position.

The method of FIG. 2 also includes fitting (228), by the animation module, the one or more images (226) representing the participant with the generic animation template (224). Fitting (228) the one or more images (226) with the generic animation template (224) may be carried out by resizing the one or more images to conform with the size of the generic animation template, identifying specific facial features of the one or more images, aligning the specific facial features with corresponding facial features of the generic animation template, and reshaping the generic animation template to conform with the one or more images. Reshaping the generic animation template may be carried out by redefining the vertices of polygons or redefining control points and weights of curves depending upon the implementation of the modeling process.

The method of FIG. 2 also includes texture wrapping (232), by the animation module, the one more images (226) representing the participant over the generic animation template (224). Texture wrapping (232) the one more images (226) over the generic animation template (224) may be carried out by creating a UV map (230) of the one or more images (226) and associating portions of the UV map with corresponding vertices or control points of the generic animation template. For example, the mouth portion of the UV map is associated with the mouth portion of the generic animation template, the nose portion of the UV map is associated with the nose portion of the generic animation template and so on. A UV map is a two dimensional image representing a three dimensional object. A UV map is so named, "UV," because in contrast to the X, Y, and Z coordinates that define the object in three dimensional space, the UV map defines the three dimensional object in only two dimensions, the U and V dimensions.

The method of FIG. 2 also includes displaying (236), by the animation module, the one or more images texture wrapped over the generic animation template. Displaying (236) the one or more images texture wrapped over the generic animation template may be carried out by rendering on the display of the mobile communications device the one or more images texture wrapped over the generic animation template as the avatar for the participant.

After displaying (236) the one or more images texture wrapped over the generic animation template the method of FIG. 2 continues at the method of FIG. 3. The method of FIG. 3 sets forth a flow chart illustrating additional steps of animating speech of an avatar representing a participant in a mobile communication according to embodiments of the present invention. The method of FIG. 3 includes receiving (240), by the animation module, an audio speech signal (242) derived from the mobile communication of the participant. Receiving (240) an audio speech signal (242) may be carried out by receiving text from the participant's mobile communications device and creating synthesized speech from the text or, in the alternative, receiving audio from the participant's mobile communications device.

The method of FIG. 3 also includes identifying (244), by the animation module from the audio speech signal (242), a series of phonemes (246), each phoneme representing a portion of the audio speech signal. Identifying (244) a series of phonemes (246) may be carried out by using an Automatic Speech Recognition ('ASR') engine as described above.

For each phoneme (246) identified (244) from the audio speech signal (242), the method of FIG. 3 continues by: identifying (248) a new mouth position (250) for the mouth of the generic animation template (224 on FIG. 2); altering (252) the mouth position of the mouth of the generic animation template to the new mouth position (250); texture wrapping (254) a portion of the one or more images (226 on FIG. 2) corresponding to the altered mouth position of the mouth of the generic animation template (224 on FIG. 2); displaying (256) the texture wrapped portion of the one or more images corresponding to the altered mouth position of the mouth of the generic animation template; and playing (258), synchronously with the displayed texture wrapped portion of the one or more images, the portion of the audio speech signal represented by the phoneme.

Identifying (248) a new mouth position (250) for the mouth of the generic animation template (224 on FIG. 2) may be carried out by locating in a phoneme map (260) a new mouth position associated with an identified phoneme (246). In the method FIG. 3, for example, the phoneme map (260) includes five phonemes that make up the word "thank." Each phoneme is associated with a position. The positions in the phoneme map (260) of FIG. 3 are shown for clarity as an X, Y, Z coordinate, but readers of skill in the art will recognize that the position associated with a phoneme may be a set of coordinates defining a group of polygons or a group of control points and weights.

Altering (252) the mouth position of the mouth of the generic animation template to the new mouth position (250) may be carried out by redefining the vertices or control points and weights of the portion of the generic animation template corresponding to the mouth to the vertices or control points and weights identified from the phoneme map. Texture wrapping (254) a portion of the one or more images (226 on FIG. 2) corresponding to the altered mouth position of the mouth of the generic animation template (224 on FIG. 2) may be carried out by associating the mouth portion of the UV map (230 on FIG. 2) with the new corresponding vertices or control points of the altered generic animation template.

Displaying (256) the texture wrapped portion of the one or more images corresponding to the altered mouth position of the mouth of the generic animation template may be carried out by rendering the mouth portion of the one or more images texture wrapped over the altered generic animation template with the previously displayed one or more images texture wrapped over the generic animation template. That is, only the altered mouth portion of the avatar is rendered for display, while the remaining portion of the avatar is a static display. In this way, in contrast to an entire re-wrapping and re-rendering of the avatar, the texture wrapping and display of the avatar is lightweight.

Playing (258), synchronously with the displayed texture wrapped portion of the one or more images, the portion of the audio speech signal represented by the phoneme may be carried out by delaying the playing of the portion of audio speech to coincide with the display of the texture wrapped portion of the one or more images corresponding to the altered mouth position of the mouth of the generic animation template. In this way, the speech of an avatar will be animated such that the avatar appears to be speaking synchronously with the audio of the speech.

Figure 4:
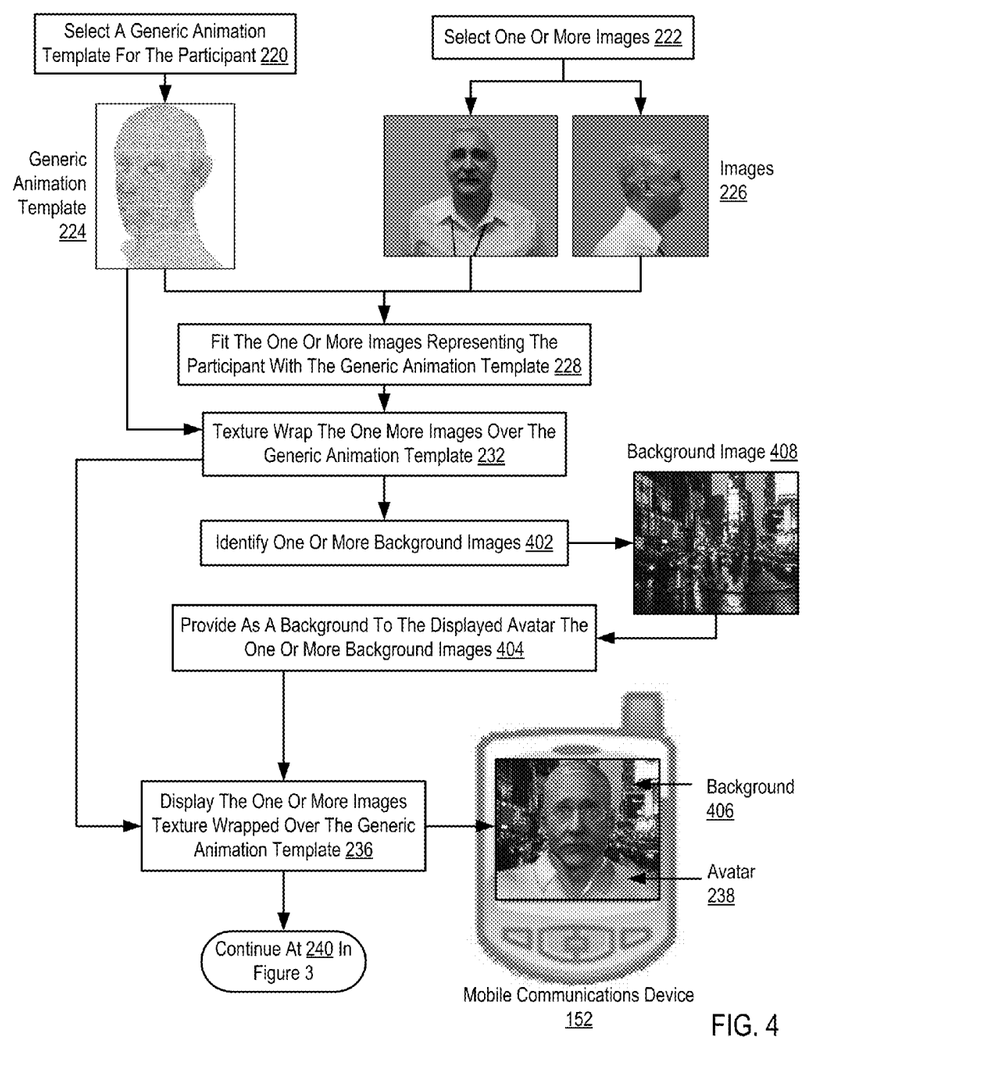
FIG. 4 sets forth a flow chart illustrating a further exemplary method for animating speech of an avatar representing a participant in a mobile communication according to embodiments of the present invention.

For further explanation, FIG. 4 sets forth a flow chart illustrating a further exemplary method for animating speech of an avatar representing a participant in a mobile communication according to embodiments of the present invention. The method of FIG. 4 is similar to the method of FIG. 2 in that the method of FIG. 4 includes selecting (222) one or more images (226) to represent the participant; selecting (220) a generic animation template (224) for the participant; fitting (228) the one or more images (226) with the generic animation template (224); texture wrapping (232) the one more images (226) over the generic animation template (224); and displaying (236) the one or more images (226) texture wrapped over the generic animation template (224).

The method of FIG. 4 differs from the method of FIG. 2, however, in that the method of FIG. 4 includes identifying (402), by the animation module, one or more background images (226) and providing (404), by the animation module, as a background (406) to the displayed avatar (238) the one or more background images (408). A background image is an image that may be displayed behind an avatar. The background may be implemented as a static image or, alternatively, as a movie or animation. The background may be implemented as a movie or animation by displaying many images in series behind the avatar.

Identifying (402), by the animation module, one or more background images (226) may be carried out in various ways such as, identifying a caller and identifying background images in dependence upon the caller identification, or by identifying a predefined default background image. A manufacturer of a mobile communications device, for example, may provide one or more images as default background images.

Providing (404) as a background (406) to the displayed avatar (238) the one or more background images (408) may be carried out through a technique called Chroma key. Chroma key is a technique for blending two images in which a color or small color range from one image is replaced by another image. Such a technique is often referred to as greenscreen or bluescreen and is employed in weather forecast broadcasts. In the method of FIG. 3, for example, the background (406) of the displayed avatar (238) is a picture of Times Square in New York.

In addition to displaying a background image behind the animated avatar, embodiments of the present invention may also include displaying foreground images in front of the animated avatar. Text and symbol overlays, for example, may be displayed in front of the avatar to augment the speech of the animated avatar.

Figure 5:
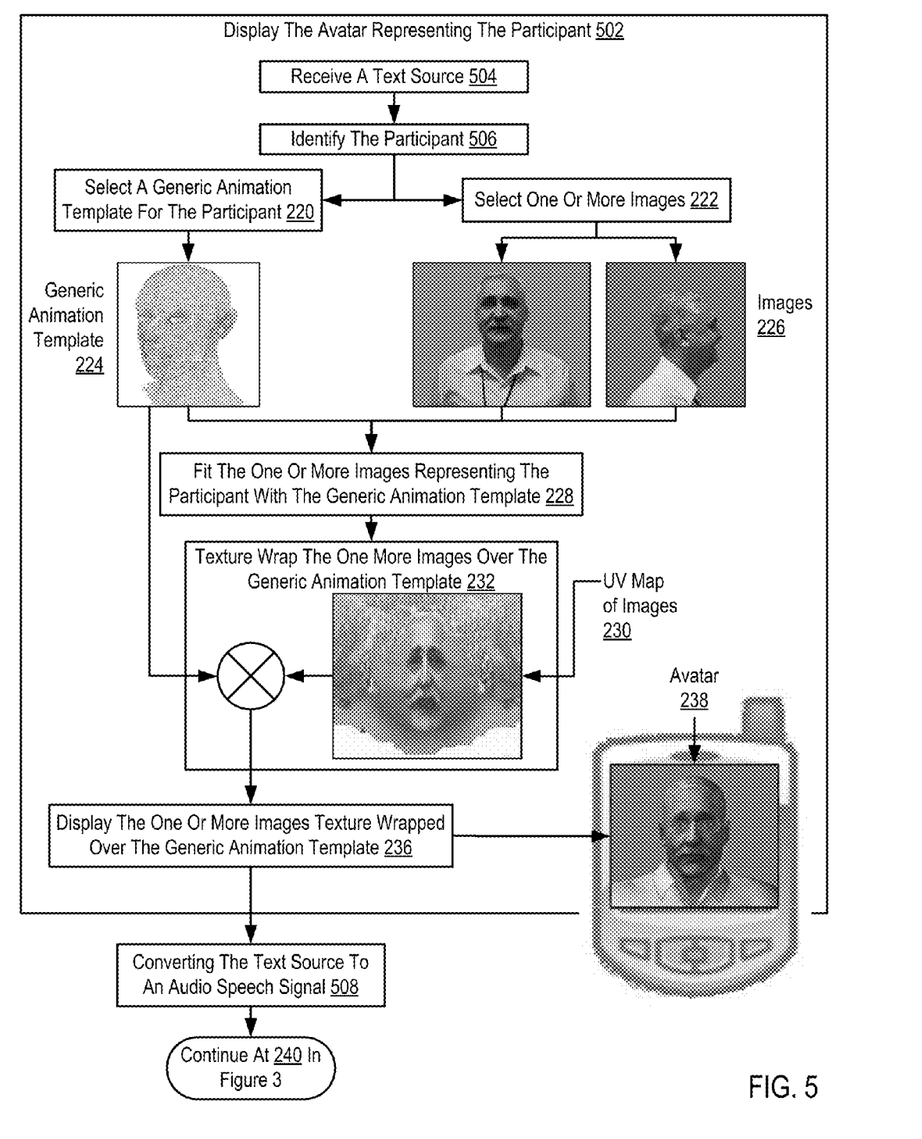
FIG. 5 sets forth a flow chart illustrating a further exemplary method for animating speech of an avatar representing a participant in a mobile communication according to embodiments of the present invention.

For further explanation, FIG. 5 sets forth a flow chart illustrating a further exemplary method for animating speech of an avatar representing a participant in a mobile communication according to embodiments of the present invention. The method of FIG. 5 includes displaying (502), by an animation module installed on the mobile communications device, the avatar (230) representing the participant. In the method of FIG. 5, displaying (502) the avatar (230) representing the participant includes steps described above with regard to FIG. 2, including selecting (222) one or more images (226) to represent the participant; selecting (220) a generic animation template (224) for the participant; fitting (228) the one or more images (226) with the generic animation template (224); texture wrapping (232) the one more images (226) over the generic animation template (224); and displaying (236) the one or more images (226) texture wrapped over the generic animation template (224).

The method of FIG. 5 differs from the method of FIG. 2 in that the method of FIG. 5 includes receiving (504) a text source and identifying (506), in dependence upon the text source, the participant. A text source is a collection of text from which an audio speech signal may be converted. Examples of text sources include email messages, a file, one or more small message system ('SMS') text messages, and so on. Receiving (504) a text source may be carried out in various in dependence upon a type of the text source including, for example, retrieving an email message from an email server, retrieving a file from remote data storage or local data storage, receiving an SMS text message through an SMS application executing on the mobile communications device, and so on. Identifying (506) the participant in dependence upon the text source may also be carried out in various ways depending upon the implementation of text source, including, for example, by identifying the participant as a sender of an email message, by identifying the participant as an author of a file from metadata associated with the file, by identifying the participant as the sender of an SMS text message, and so on.

The method of FIG. 5 also includes converting (508) the text source to an audio speech signal. Converting (508) the text source to an audio speech signal may be carried out by parsing the text from the text source, and performing converting text-to-speech through use of a text-to-speech engine as described above with respect to FIG. 1. Using text-to-speech conversion as described in FIG. 5 enables a participant in a mobile communication to effectively simulate a video conference. This may be especially useful in situations where the participant is located with a mobile phone in a noisy environment inhibiting speech through a mobile communications device.

Figure 6:
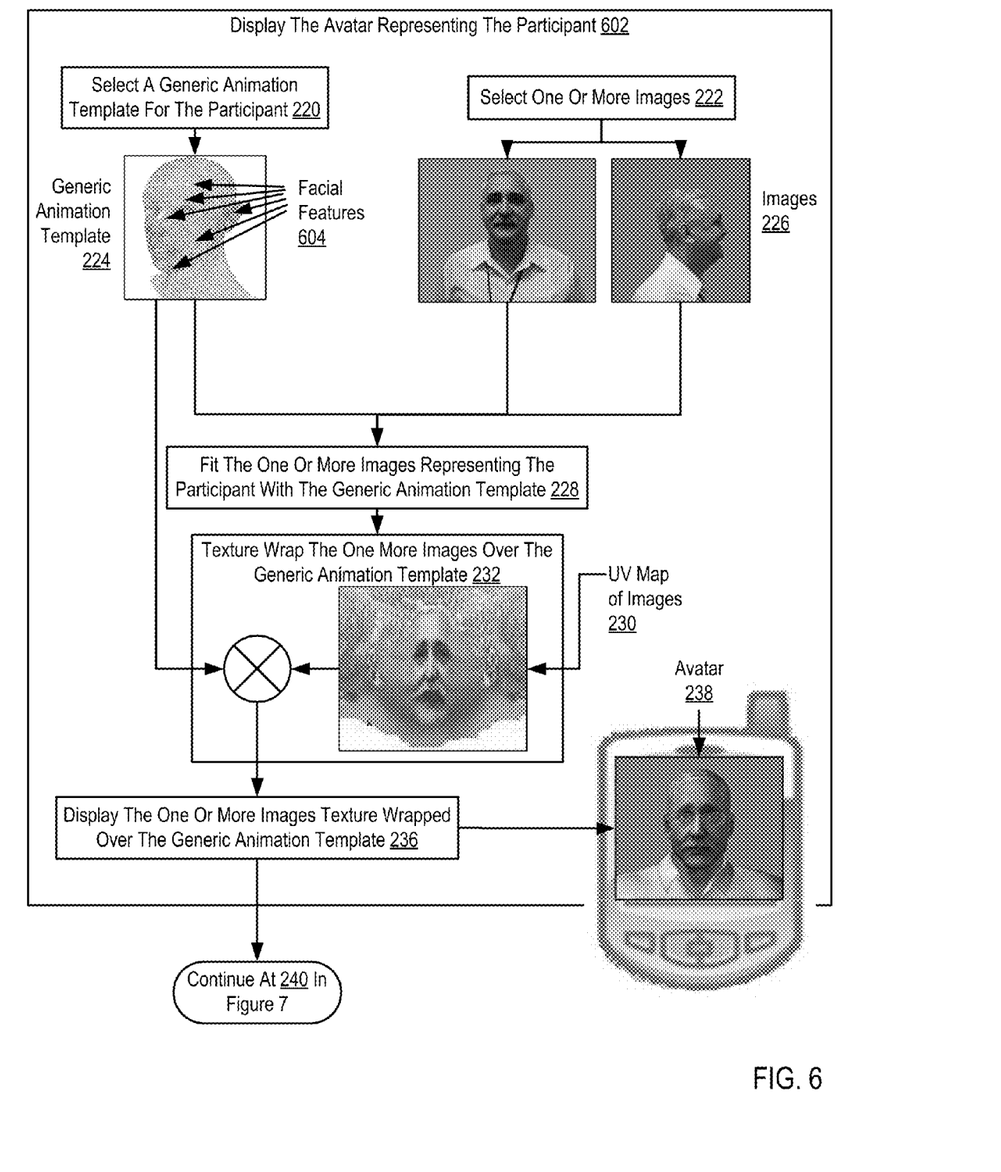
FIG. 6 and FIG. 7 set forth a flow chart illustrating a further exemplary method for animating speech of an avatar representing a participant in a mobile communication according to embodiments of the present invention.
Figure 7:
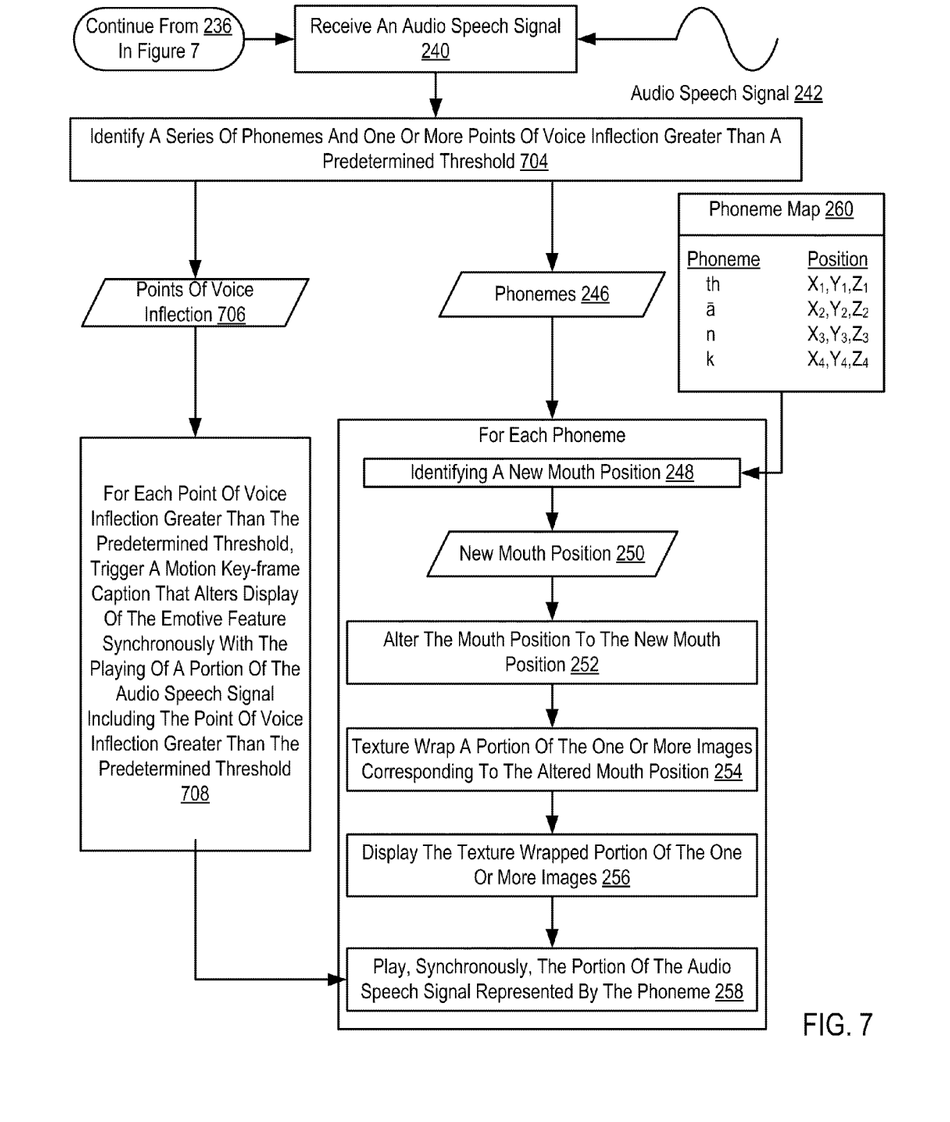

For further explanation, FIG. 6 and FIG. 7 set forth a flow chart illustrating a further exemplary method for animating speech of an avatar representing a participant in a mobile communication according to embodiments of the present invention. The method of FIG. 6 includes displaying (602), by an animation module installed on the mobile communications device, the avatar (230) representing the participant. In the method of FIG. 6, displaying (602) the avatar (230) representing the participant includes steps described above with regard to FIG. 2, including selecting (222) one or more images (226) to represent the participant; selecting (220) a generic animation template (224) for the participant; fitting (228) the one or more images (226) with the generic animation template (224); texture wrapping (232) the one more images (226) over the generic animation template (224); and displaying (236) the one or more images (226) texture wrapped over the generic animation template (224).

The method of FIG. 6 differs from the method of FIG. 2, however, in that in the method of FIG. 6, the generic animation template (224) has, in an addition to a mouth, at least one emotive feature. An emotive feature is any portion of a generic animation template that may be altered to simulate gestures or movements representing emotion in a participant's avatar. In the example of FIG. 6, the generic animation template (224) includes several emotive features represented as facial features, such as a nose, an eyebrow, a brow, an ear, a dimple, and a chin. Other example emotive features include non-facial features such as a finger, a hand, an arm, a shoulder, and a chest.

The method of FIG. 6 continues at the method of FIG. 7, by receiving (240) an audio speech signal (242) and identifying (704), from the audio speech signal (242), a series of phonemes (246) and one or more points of voice inflection (706) greater than a predetermined threshold. Identifying (704) one or more points of voice inflection (706) greater than a predetermined threshold may be carried out in various ways including for example, digitizing the audio signal, calculating the standard deviation of the values of the digitized audio signal, and identifying as points of voice inflection (706) greater than a predetermined threshold, portions of the audio signal having values outside the standard deviation. This is but one statistical method to identify points of voice inflection greater than a predetermined threshold, but persons of skill in the art will recognize that there may be many other ways to identify points of voice inflection greater than a predetermined threshold. Each such way is well within the scope of the present invention.

The method of FIG. 7, like the method of FIG. 3 also includes: identifying (248) a new mouth position (250) for the mouth of the generic animation template (224 on FIG. 2); altering (252) the mouth position of the mouth of the generic animation template to the new mouth position (250); texture wrapping (254) a portion of the one or more images (226 on FIG. 2) corresponding to the altered mouth position of the mouth of the generic animation template (224 on FIG. 2); displaying (256) the texture wrapped portion of the one or more images corresponding to the altered mouth position of the mouth of the generic animation template; and playing (258), synchronously with the displayed texture wrapped portion of the one or more images, the portion of the audio speech signal represented by the phoneme.

The method of FIG. 7 also includes, for each point of voice inflection (706) greater than the predetermined threshold, triggering (708) a motion key-frame caption that alters display of the emotive feature synchronously with the playing of a portion of the audio speech signal including the point of voice inflection greater than the predetermined threshold. A motion key-frame caption is a predefined or pre-captured animation of an emotive feature. In some embodiments, triggering (708) the motion key-frame caption includes altering display of the one or more facial features of the avatar by moving one or both ears, depressing one or both dimples, raising one or both eyebrows, furrowing the brow, moving the chin, or wrinkling the nose of the avatar. In additional embodiments, triggering (708) the motion key-frame caption includes altering display of one or more non-facial features of the avatar by moving one or more fingers, waving one or more of the avatar's hands, raising one or more of the avatar's arms, shrugging one or more of the avatar's shoulders, or expanding and retracting the chest to simulate breathing. These are only several examples of pre-captured animations that may be displayed to simulate emotions of an avatar. Readers of skill in the art will recognize that many other animations of an avatar may also simulate emotions or body language and each such animation is well within the scope of the present invention.

Figure 8:
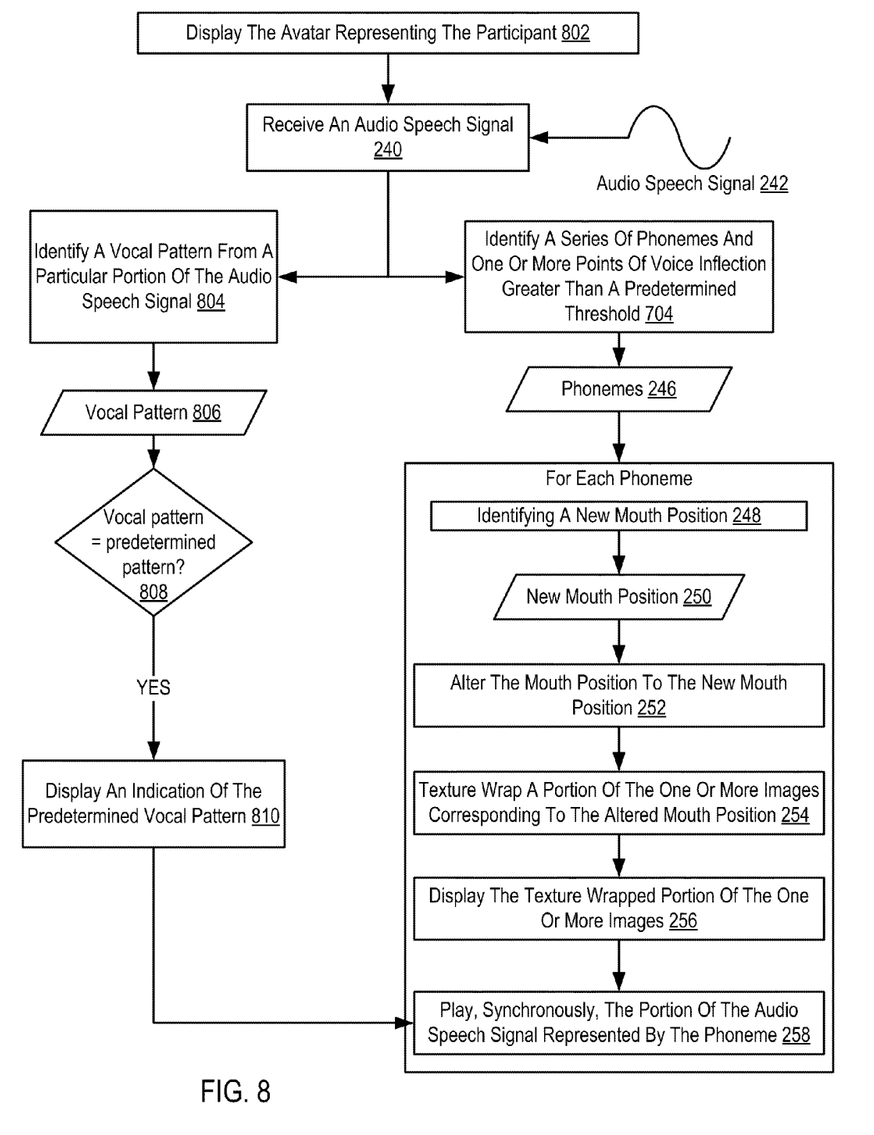
FIG. 8 sets forth a flow chart illustrating a further exemplary method for animating speech of an avatar representing a participant in a mobile communication according to embodiments of the present invention.

For further explanation, FIG. 8 sets forth a flow chart illustrating a further exemplary method for animating speech of an avatar representing a participant in a mobile communication according to embodiments of the present invention. The method of FIG. 8 includes displaying (802), by an animation module installed on the mobile communications device, the avatar (230) representing the participant. In the method of FIG. 8, displaying (802) the avatar (230) representing the participant includes steps described above with regard to FIG. 2, including selecting (222) one or more images (226) to represent the participant; selecting (220) a generic animation template (224) for the participant; fitting (228) the one or more images (226) with the generic animation template (224); texture wrapping (232) the one more images (226) over the generic animation template (224); and displaying (236) the one or more images (226) texture wrapped over the generic animation template (224).

The method of FIG. 8 also includes receiving (240), by the animation module, an audio speech signal (242) derived from the mobile communication of the participant and identifying (804) a vocal pattern (806) from a particular portion of the audio speech signal (242). A vocal pattern is a characterization of an audio speech signal. A characterization of an audio speech signal may be derived in many ways including, for example, from frequencies of the audio signal, decibel levels of the audio speech signal, pattern, moments of silence, and so on as will occur to readers of skill in the art. Identifying (804) a vocal pattern from a particular portion of the audio speech signal may be carried out in various ways including, for example, converting the audio speech signal from an analog audio signal to a digital audio signal and analyzing the digital audio signal to identify the vocal pattern.

The method of FIG. 8 also includes determining (808) whether the vocal pattern matches a predetermined vocal pattern. A predetermined vocal pattern is a predetermined characterization of an audio speech signal. Predetermined vocal patterns may be indicative of various emotions and characteristics of the speaker derived from the audio speech signal itself. Predetermined vocal patterns useful in various embodiments of the present invention may include, for example, a vocal pattern used to authenticate a speaker, a vocal pattern indicating a lying speaker, a vocal pattern indicating a sad speaker, a vocal pattern indicating a frightened speaker, a vocal pattern indicating a happy speaker, a vocal pattern indicating an excited speaker, and a vocal pattern indicating a drowsy speaker. Determining (808) whether the vocal pattern matches a predetermined vocal pattern may be carried out by comparing a digitally analyzed vocal pattern to a plurality of predetermined vocal patterns stored in a repository of predetermined vocal patterns.

The method of FIG. 8 also includes identifying (704), by the animation module from the audio speech signal, a series of phonemes, each phoneme representing a portion of the audio speech signal and for each phoneme: identifying (248) a new mouth position (250) for the mouth of the generic animation template, altering (252) the mouth position of the mouth of the generic animation template to the new mouth position, texture wrapping (254) a portion of the one or more images corresponding to the altered mouth position of the mouth of the generic animation template, displaying (256) the texture wrapped portion of the one or more images corresponding to the altered mouth position of the mouth of the generic animation template, and playing (258), synchronously with the displayed texture wrapped portion of the one or more images, the portion of the audio speech signal represented by the phoneme.

In the example of FIG. 8, if the vocal pattern (806) of the particular portion of the audio speech signal (242) matches a predetermined vocal pattern the method continues by displaying (810) an indication of the predetermined vocal pattern synchronously with the playing of the particular portion of the audio speech signal. Displaying (810) an indication of the predetermined vocal pattern synchronously with the playing of the particular portion of the audio speech signal may be carried out in various ways including, for example, by overlaying text on the display of the texture wrapped portion of the one or more images of the participant identifying the predetermined pattern, or by changing a background of the avatar from one color to another, or in other ways as will occur to those of skill in the art.

Exemplary embodiments of the present invention are described largely in the context of a fully functional computer system for animating speech of an avatar representing a participant in a mobile communication. Readers of skill in the art will recognize, however, that the present invention also may be embodied in a computer program product disposed on recordable media for use with any suitable data processing system. Such recordable media include magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of animating speech of an avatar representing a participant in a mobile communication, the method comprising:
    selecting, by a computer, from data storage, one or more images to represent the participant;
    selecting, by the computer, from data storage, a generic animation template for the participant, the generic animation template having a mouth and at least one emotive feature, the mouth characterized by a mouth position;
    fitting, by the computer, the one or more images with the generic animation template;
    texture wrapping, by the computer, the one or more images over the generic animation template;
    displaying, by the computer, the one or more images texture wrapped over the generic animation template;
    receiving, by the computer, an audio speech signal derived from the mobile communication of the participant;
    identifying, by the computer, from the audio speech signal, a series of phonemes and one or more points of voice inflection greater than a predetermined threshold, each phoneme in the series of phonemes representing a portion of the audio speech signal;
    for each phoneme in the series of phonemes:
        identifying, by the computer, a new mouth position for the mouth of the generic animation template;
        altering, by the computer, the mouth position of the mouth of the generic animation template to the new mouth position;
        texture wrapping, by the computer, a portion of the one or more images corresponding to the altered mouth position of the mouth of the generic animation template;
        displaying, by the computer, the texture wrapped portion of the one or more images corresponding to the altered mouth position of the mouth of the generic animation template; and
        playing, by the computer, synchronously with the displayed texture wrapped portion of the one or more images, the portion of the audio speech signal represented by the phoneme; and
    for each point of voice inflection of the one or more points of inflection greater than the predetermined threshold, triggering, by the computer, a motion key-frame caption that alters display of the at least one emotive feature synchronously with playing, by the computer, a portion of the audio speech signal including the point of voice inflection greater than the predetermined threshold.

2. The method of claim 1 wherein the at least one emotive feature comprises one or more facial features.

3. The method of claim 2 wherein the triggering the motion key-frame caption comprises altering display of the one or more facial features.

4. The method of claim 1 wherein the at least one emotive feature comprises one or more non-facial features.

5. The method of claim 4 wherein the triggering the motion key-frame caption comprises altering display of the one or more non-facial features.

6. The method of claim 1 wherein the fitting the one or more images with the generic animation template comprises:
    resizing the one or more images to conform with the size of the generic animation template;
    identifying specific facial features of the one or more images;
    aligning the specific facial features with corresponding facial features of the generic animation template; and
    reshaping the generic animation template to conform with the one or more images.

7. The method of claim 1 wherein the identifying the new mouth position for the mouth of the generic animation template comprises retrieving coordinates of the new mouth position from a data structure in dependence upon an identification of the phoneme.

8. A method of animating speech of an avatar representing a participant in a mobile communication, the method comprising:
    selecting, by a computer, from data storage, one or more images to represent the participant;
    selecting, by the computer, from data storage, a generic animation template for the participant, the generic animation template having a mouth, the mouth characterized by a mouth position;
    fitting, by the computer, the one or more images with the generic animation template;
    texture wrapping, by the computer, the one or more images over the generic animation template;
    displaying, by the computer, the one or more images texture wrapped over the generic animation template; and receiving, by the computer, an audio speech signal derived from the mobile communication of the participant;

identifying, by the computer, a vocal pattern from a particular portion of the audio speech signal;

determining, by the computer, whether the vocal pattern matches a predetermined vocal pattern;

identifying, by the computer, from the audio speech signal, a series of phonemes, each phoneme in the series of phonemes representing a portion of the audio speech signal;

for each phoneme in the series of phonemes:
  identifying, by the computer, a new mouth position for the mouth of the generic animation template;
  altering, by the computer, the mouth position of the mouth of the generic animation template to the new mouth position;
  texture wrapping, by the computer, a portion of the one or more images corresponding to the altered mouth position of the mouth of the generic animation template;
  displaying, by the computer, the texture wrapped portion of the one or more images corresponding to the altered mouth position of the mouth of the generic animation template; and
  playing, by the computer, synchronously with the displayed texture wrapped portion of the one or more images, the portion of the audio speech signal represented by the phoneme; and if the vocal pattern of the particular portion of the audio speech signal matches the predetermined vocal pattern, displaying, by the computer, an indication of the predetermined vocal pattern synchronously with playing, by the computer, the particular portion of the audio speech signal.

9. The method of claim 8 wherein the predetermined vocal pattern comprises one of:
  a vocal pattern used to authenticate a speaker;
  a vocal pattern indicating a lying speaker;
  a vocal pattern indicating a sad speaker;
  a vocal pattern indicating a frightened speaker;
  a vocal pattern indicating a happy speaker;
  a vocal pattern indicating an excited speaker; and
  a vocal pattern indicating a drowsy speaker.

10. The method of claim 8 wherein:
  the identifying the vocal pattern from the particular portion of the audio speech signal comprises converting the audio speech signal from an analog audio signal to a digital audio signal and analyzing the digital audio signal to identify the vocal pattern; and
  the determining whether the vocal pattern matches the predetermined vocal pattern comprises comparing the identified vocal pattern to a plurality of predetermined vocal patterns stored in a repository of predetermined vocal patterns.

11. The method of claim 2 wherein the one or more facial features include at least one of an ear, a dimple, an eyebrow, a brow, a chin, and a nose.

12. The method of claim 3 wherein the altering display of the one or more facial features includes at least one of moving at least one ear, depressing at least one dimple, raising at least one eyebrow, furrowing a brow, moving a chin, and wrinkling a nose.

13. The method of claim 4 wherein the one or more non-facial features include at least one of a finger, a hand, an arm, a shoulder, and a chest.

14. The method of claim 5 wherein the altering display of the one or more non-facial features includes at least one of moving one or more fingers, waving one or more hands, raising one or more arms, shrugging one or more shoulders, and expanding and retracting the chest.

15. A system for animating speech of an avatar representing a participant in a mobile communication, the system configured to display the avatar on a display screen of a mobile communications device, the system comprising:
  one or more processors, one or more computer-readable memories, and one or more computer-readable tangible storage devices;
  program instructions, stored on at least one of the one or more storage devices for execution by at least one of the one or more processors via at least one of the one or more memories, to select, from data storage, one or more images to represent the participant;
  program instructions, stored on at least one of the one or more storage devices for execution by at least one of the one or more processors via at least one of the one or more memories, to select, from data storage, a generic animation template for the participant, the generic animation template having a mouth and at least one emotive feature, the mouth characterized by a mouth position;
  program instructions, stored on at least one of the one or more storage devices for execution by at least one of the one or more processors via at least one of the one or more memories, to fit the one or more images with the generic animation template;
  program instructions, stored on at least one of the one or more storage devices for execution by at least one of the one or more processors via at least one of the one or more memories, to texture wrap the one or more images over the generic animation template;
  program instructions, stored on at least one of the one or more storage devices for execution by at least one of the one or more processors via at least one of the one or more memories, to display the one or more images texture wrapped over the generic animation template;
  program instructions, stored on at least one of the one or more storage devices for execution by at least one of the one or more processors via at least one of the one or more memories, to receive an audio speech signal derived from the mobile communication of the participant;
  program instructions, stored on at least one of the one or more storage devices for execution by at least one of the one or more processors via at least one of the one or more memories, to identify, from the audio speech signal, a series of phonemes and one or more points of voice inflection greater than a predetermined threshold, each phoneme in the series of phonemes representing a portion of the audio speech signal;
  program instructions, stored on at least one of the one or more storage devices for execution by at least one of the one or more processors via at least one of the one or more memories, to, for each phoneme in the series of phonemes:
    identify a new mouth position for the mouth of the generic animation template;
    alter the mouth position of the mouth of the generic animation template to the new mouth position;
    texture wrap a portion of the one or more images corresponding to the altered mouth position of the mouth of the generic animation template;
    display the texture wrapped portion of the one or more images corresponding to the altered mouth position of the mouth of the generic animation template; and play synchronously with the displayed texture wrapped portion of the one or more images, the portion of the audio speech signal represented by the phoneme; and program instructions, stored on at least one of the one or more storage devices for execution by at least one of the one or more processors via at least one of the one or more memories, to, for each point of voice inflection of the one or more points of inflection greater than the predetermined threshold, trigger a motion key-frame caption that alters display of at least one emotive feature synchronously with playing a portion of the audio speech signal including the point of voice inflection greater than the predetermined threshold.

16. A computer program product for animating speech of an avatar representing a participant in a mobile communication, the computer program product comprising:

one or more computer-readable tangible storage devices;

program instructions, stored on at least one of the one or more storage devices, to select, from data storage, one or more images to represent the participant;

program instructions, stored on at least one of the one or more storage devices, to select, from data storage, a generic animation template for the participant, the generic animation template having a mouth and at least one emotive feature, the mouth characterized by a mouth position;

program instructions, stored on at least one of the one or more storage devices, to fit the one or more images with the generic animation template;

program instructions, stored on at least one of the one or more storage devices, to texture wrap the one or more images over the generic animation template;

program instructions, stored on at least one of the one or more storage devices, to display the one or more images texture wrapped over the generic animation template;

program instructions, stored on at least one of the one or more storage devices, to receive an audio speech signal derived from the mobile communication of the participant;

program instructions, stored on at least one of the one or more storage devices, to identify from the audio speech signal, a series of phonemes and one or more points of voice inflection greater than a predetermined threshold, each phoneme in the series of phonemes representing a portion of the audio speech signal;

program instructions, stored on at least one of the one or more storage devices, to, for each phoneme in the series of phonemes:

identify a new mouth position for the mouth of the generic animation template;

alter the mouth position of the mouth of the generic animation template to the new mouth position;

texture wrap a portion of the one or more images corresponding to the altered mouth position of the mouth of the generic animation template;

display the texture wrapped portion of the one or more images corresponding to the altered mouth position of the mouth of the generic animation template; and play synchronously with the displayed texture wrapped portion of the one or more images, the portion of the audio speech signal represented by the phoneme; and program instructions, stored on at least one of the one or more storage devices, to, for each point of voice inflection of the one or more points of inflection greater than the predetermined threshold, trigger a motion key-frame caption that alters display of at least one emotive feature synchronously with playing a portion of the audio speech signal including the point of voice inflection greater than the predetermined threshold.

17. A system for animating speech of an avatar representing a participant in a mobile communication, the system configured to display the avatar on a display screen of a mobile communications device, the system comprising:

one or more processors, one or more computer-readable memories, and one or more computer-readable tangible storage devices;

program instructions, stored on at least one of the one or more storage devices for execution by at least one of the one or more processors via at least one of the one or more memories, to select, from data storage, one or more images to represent the participant;

program instructions, stored on at least one of the one or more storage devices for execution by at least one of the one or more processors via at least one of the one or more memories, to select, from data storage, a generic animation template for the participant, the generic animation template having a mouth, the mouth characterized by a mouth position;

program instructions, stored on at least one of the one or more storage devices for execution by at least one of the one or more processors via at least one of the one or more memories, to fit the one or more images with the generic animation template;

program instructions, stored on at least one of the one or more storage devices for execution by at least one of the one or more processors via at least one of the one or more memories, to texture wrap the one or more images over the generic animation template;

program instructions, stored on at least one of the one or more storage devices for execution by at least one of the one or more processors via at least one of the one or more memories, to display the one or more images texture wrapped over the generic animation template;

program instructions, stored on at least one of the one or more storage devices for execution by at least one of the one or more processors via at least one of the one or more memories, to receive an audio speech signal derived from the mobile communication of the participant;

program instructions, stored on at least one of the one or more storage devices for execution by at least one of the one or more processors via at least one of the one or more memories, to identify a vocal pattern from a particular portion of the audio speech signal;

program instructions, stored on at least one of the one or more storage devices for execution by at least one of the one or more processors via at least one of the one or more memories, to determine whether the vocal pattern matches a predetermined vocal pattern;

program instructions, stored on at least one of the one or more storage devices for execution by at least one of the one or more processors via at least one of the one or more memories, to identify, from the audio speech signal, a series of phonemes, each phoneme in the series of phonemes representing a portion of the audio speech signal;

program instructions, stored on at least one of the one or more storage devices for execution by at least one of the one or more processors via at least one of the one or more memories, to, for each phoneme in the series of phonemes:

identify a new mouth position for the mouth of the generic animation template;

alter the mouth position of the mouth of the generic animation template to the new mouth position;

texture wrap a portion of the one or more images corresponding to the altered mouth position of the mouth of the generic animation template;

display the texture wrapped portion of the one or more images corresponding to the altered mouth position of the mouth of the generic animation template; and play synchronously with the displayed texture wrapped portion of the one or more images, the portion of the audio speech signal represented by the phoneme; and program instructions, stored on at least one of the one or more storage devices for execution by at least one of the one or more processors via at least one of the one or more memories, to, if the vocal pattern of the particular portion of the audio speech signal matches the predetermined vocal pattern, display an indication of the predetermined vocal pattern synchronously with playing the particular portion of the audio speech signal.

18. A computer program product for animating speech of an avatar representing a participant in a mobile communication, the computer program product comprising:

one or more computer-readable tangible storage devices;

program instructions, stored on at least one of the one or more storage devices, to select, from data storage, one or more images to represent the participant;

program instructions, stored on at least one of the one or more storage devices, to select, from data storage, a generic animation template for the participant, the generic animation template having a mouth, the mouth characterized by a mouth position;

program instructions, stored on at least one of the one or more storage devices, to fit the one or more images with the generic animation template;

program instructions, stored on at least one of the one or more storage devices, to texture wrap the one or more images over the generic animation template;

program instructions, stored on at least one of the one or more storage devices, to display the one or more images texture wrapped over the generic animation template;

program instructions, stored on at least one of the one or more storage devices, to receive an audio speech signal derived from the mobile communication of the participant;

program instructions, stored on at least one of the one or more storage devices, to identify a vocal pattern from a particular portion of the audio speech signal;

program instructions, stored on at least one of the one or more storage devices, to determine whether the vocal pattern matches a predetermined vocal pattern;

program instructions, stored on at least one of the one or more storage devices, to identify from the audio speech signal, a series of phonemes, each phoneme in the series of phonemes representing a portion of the audio speech signal;

program instructions, stored on at least one of the one or more storage devices, to, for each phoneme in the series of phonemes:

identify a new mouth position for the mouth of the generic animation template;

alter the mouth position of the mouth of the generic animation template to the new mouth position;

texture wrap a portion of the one or more images corresponding to the altered mouth position of the mouth of the generic animation template;

display the texture wrapped portion of the one or more images corresponding to the altered mouth position of the mouth of the generic animation template; and play synchronously with the displayed texture wrapped portion of the one or more images, the portion of the audio speech signal represented by the phoneme; and program instructions, stored on at least one of the one or more storage devices, to, if the vocal pattern of the particular portion of the audio speech signal matches the predetermined vocal pattern, display an indication of the predetermined vocal pattern synchronously with playing the particular portion of the audio speech signal.

* * * * *